Oct. 14, 1924.
A. L. STEWART
1,511,242
SELF GUIDING AND RIDING CULTIVATOR
Filed July 22, 1922    2 Sheets-Sheet 1
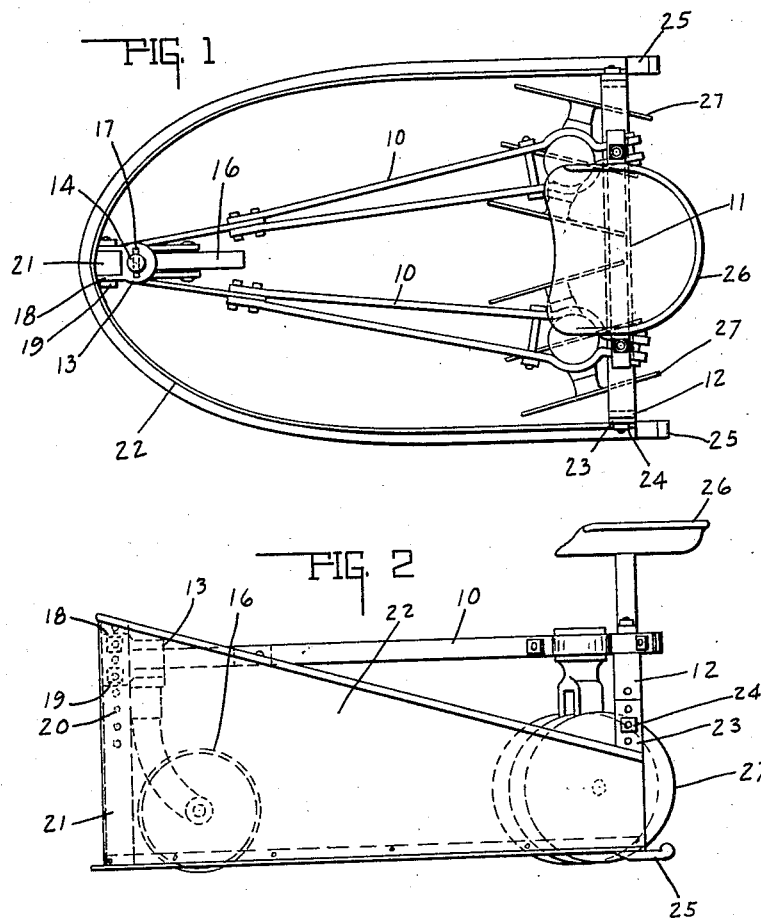
INVENTOR.
ALONZO L. STEWART.
BY
Lockwood & Lockwood
ATTORNEYS.

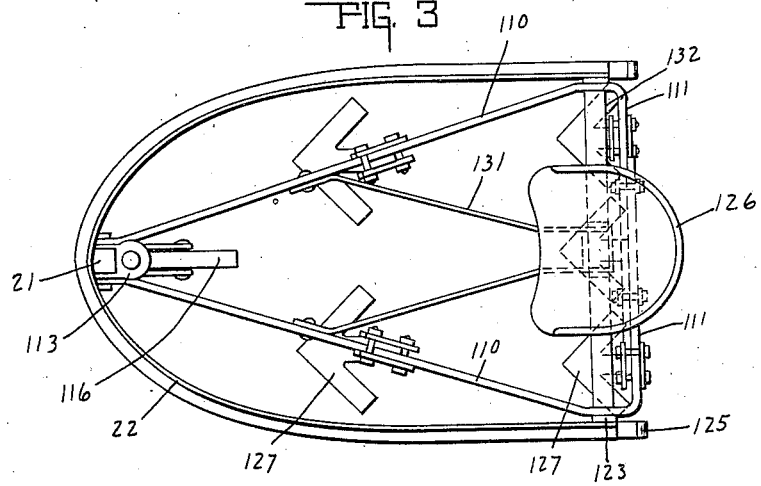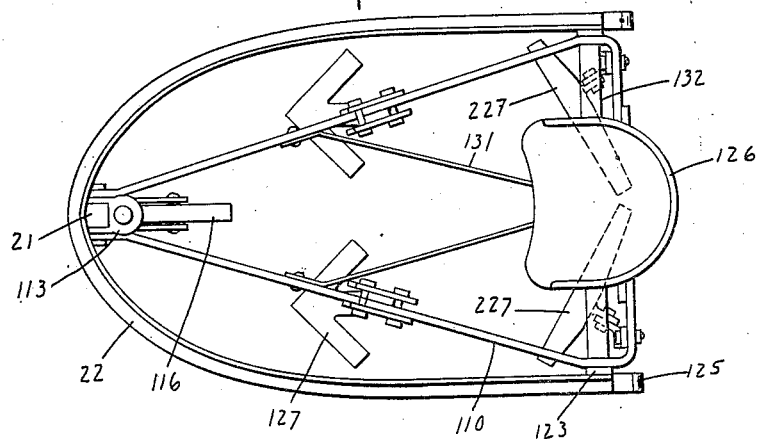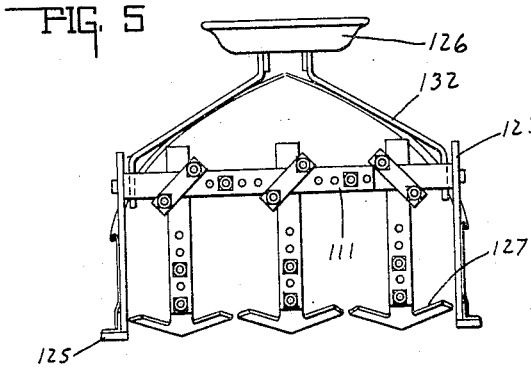

Patented Oct. 14, 1924.

1,511,242

UNITED STATES PATENT OFFICE.

ALONZO L. STEWART, OF RUSHVILLE, INDIANA.

SELF-GUIDING AND RIDING CULTIVATOR.

Application filed July 22, 1922. Serial No. 576,695.

*To all whom it may concern:*

Be it known that I, ALONZO L. STEWART, a citizen of the United States, and a resident of Rushville, county of Rush, and State of Indiana, have invented a certain new and useful Self-Guiding and Riding Cultivator; and I do hereby declare that the following is a full, clear, and exact description thereof, reference being had to the accompanying drawings, in which like numerals refer to like parts.

This invention relates to a self-guiding, riding cultivator and corn turning agricultural device.

The chief object of the invention is to provide an agricultural device of the character indicated, which will permit cultivation at all times of the season in fields of cotton, corn or other plants in row cultivation and also for cultivating and turning corn without the necessity of having the corn turned by hand ahead of the cultivating device.

Another object of the invention is to construct the device in such a manner that the device will be self-guiding, in that it will position itself in the row and maintain itself in said row at all times unless forcibly directed otherwise when desired.

And still a further object of the invention is to construct the same that the driver may ride upon the device if desired, and the construction of the device is such that riding upon the same will not cause the cultivating attachments thereon to cultivate to an undue depth.

The chief feature of the invention consists in the accomplishment of the foregoing objects, and in addition thereto other features of the invention consist in the adjustability of the corn turning attachment, the adjustability and interchangeability of the cultivating attachments and the adjustability of the framework with respect to the supporting means such that the depth of cultivation may be regulated.

The full nature of the invention will be understood from the accompanying drawings and the following description and claims.

In the drawings, Fig. 1 is a top plan view of a cultivating device embodying the features of the invention. Fig. 2 is a side elevational view of the same. Fig. 3 is a top plan view of a modified form of cultivating device provided with cultivating attachments different from those shown in Figs. 1 and 2. Fig. 4 is a top plan view of a somewhat similar cultivating device with other cultivating attachments than those shown in Fig. 3. Fig. 5 is a rear view of the cultivating device and attachments shown in Fig. 3.

In Figs. 1 and 2 of the drawings there is illustrated what may be termed a triangular framework comprising side constructions 10 and a base 11 which is provided with downward extensions at each side thereof, as at 12. The two side constructions of the triangular construction terminate in a spindle receiving socket 13, and said spindle receiving socket 13 is adapted to receive the pintle 14 of a caster wheel construction having the wheel 16, said pintle being secured in said socket by the pin 17. The socket 13 is also provided with another socket 18, and said socket 18 is provided with openings therein to receive a bolt member 19. The bolt member 19 is receivable by the openings 20 in a vertical support 21 positioned forwardly of the caster wheel. The vertical support 21 supports a U-shaped corn turning attachment 22 which is positioned forwardly of the triangular framework and upon both sides thereof and is adjustably secured to the triangular framework through the medium of the downward extensions 12, as shown at 23 and by means of the bolt and nut means 24. Herein the corn turning attachment is shown provided with shoes 25 at each end thereof which are adapted to bear the weight of the framework and everything supported thereby. Other suitable means, such as wheels may be substituted therefor. As shown in Fig. 2, the corn turning attachment at each end is of less height than at the center thereof, and the sides flare outwardly. The construction or particular form and shape of the corn turning attachment is immaterial to the broader features of the invention, except that said corn turning attachment in certain instances is necessary in cultivating a field when the corn is down, and in guiding and regulating the cultivation.

There is also suitably secured to the framework 10 a rider's seat 26 and the weight of the rider transmitted through the framework 10 is supported by the caster wheel 16 and the shoes 25 making a three point bearing upon the ground cultivated.

In Figs. 1 and 2 the triangular framework is illustrated as adjustably and detachably supporting a plurality of cultivating attachments, such as the disks 27. The two gangs of disks 27 may be adjusted angularly of each other upon the framework in the well known manner, and the depth of cultivation is determined by the adjustable connection of the strap 23, to which is secured the shoe 25, with the downward extension 12 of the framework.

In Figs. 3 and 5 the corn turning attachment 22 is substantially similar to that hereinbefore described and is provided with a central or median support 21 for adjustably and detachably supporting the socket 113 carrying the caster wheel 116. The framework herein consists of a triangular construction having the sides 110 and the base 111. A seat 126 is likewise provided and is supported by the bars 131 which are connected to the sides 110 intermediate the ends thereof and extend rearwardly and are connected together and to the bars 132 which are secured to the framework adjacent the connection of the base 111 with the sides 110. It will be noted from Fig. 3 that the base 111 is composed of the overlapping and inwardly turned ends of the sides 110. The agricultural devices in Figs. 3 and 5 are illustrated in the form of sweeps 127 which are detachably and adjustably secured upon the sides 110 of the frame and also upon the base 111 thereof. As shown in Fig. 5 the corn turner is adjustably supported upon the framework by the strap 123 which is also provided with the usual shoe 125.

In Fig. 4 there is shown a modified form of the invention, and the modification in this instance consists in the replacement of the sweeps 127 by the surface blades 227, which likewise are adjustably and detachably secured to the framework.

The invention as herein illustrated is shown constructed in a plurality of ways. It will be noted that the characteristics of the machine in general are: a framework preferably triangular in form, a caster wheel at the apex of the triangular framework for supporting the same, corn turning means associated with the framework at or near the corners thereof and preferably adjustably associated therewith, bearing means at each of the opposite corners of the framework for engagement with the earth, a seat supported by the framework and detachably and interchangeably and adjustably mounted cultivating devices supported upon said framework.

The invention claimed is:

1. A self-guiding and riding agricultural device comprising a substantially triangular cultivating implement supporting framework, a caster wheel swivelably supported thereby and at the apex of said framework, an operator's seat supported by the rear portion of said triangular framework, a cultivating implement supported by the framework, a depending runner or shoe adjustably supported approximately at each of the other corners of the triangular framework for supporting the framework and limiting the depth of cultivation, and a substantially continuous corn-turning shield secured to each runner and positioned at, and extending forwardly of and upwardly from, said other corners towards and meeting at the apex of said triangular framework and supported thereby at said apex.

2. A device of the character described in claim 1, charaterized by an adjustable support for the shield at the apex.

In witness whereof, I have hereunto affixed my signature.

ALONZO L. STEWART.